United States Patent Office 3,502,662
Patented Mar. 24, 1970

3,502,662
N-(9-XANTHENYL OR THIOXANTHENYL)-3-
AMINO OR IODO-PROPIONAMIDES AND
4-(9-XANTHENYL OR THIOXANTHENYL)-
THIOSEMICARBAZONES
Scott J. Childress, Philadelphia, and Stephen I. Sallay,
Wynnewood, Pa., assignors to American Home Products Corporation, New York, N.Y., a corporation of
Delaware
No Drawing. Continuation-in-part of application Ser. No.
595,602, Nov. 21, 1966. This application Mar. 18, 1968,
Ser. No. 714,032
Int. Cl. A61k 27/00; C07d 7/42, 65/16
U.S. Cl. 260—240                                    6 Claims

ABSTRACT OF THE DISCLOSURE

The invention is directed to new xanthenyl derivatives, including amides and thiosemicarbazides, and a process for their preparation. The compounds have pharmacological activity in that they have exhibited anticholinergic properties and are particularly useful as anticonvulsants or mydriatic agents.

---

This application is a continuation-in-part of application Ser. No. 595,602, filed Nov. 21, 1966 by Scott J. Childress and Stephen I. Sallay, and entitled "Xanthene Derivatives."

This invention relates to new and useful xanthene derivatives. In particular, this invention relates to xanthenyl amides, xanthenyl thiosemicarbazides, and xanthenyl thiosemicarbazones having pharmacological activity.

The novel compounds which are included within the scope of this invention are represented by the following formula:

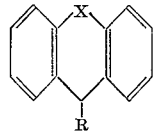
(I)

wherein R is selected from the group consisting of:

di(lower)alkylamino(lower)alkanoylamido,
4-(lower)alkylpiperazinyl(lower)alkanoylamido,
halo(lower)alkanoylamido,
thiosemicarbazido,
lower alkylideneaminothiocarbamido, and
benzylideneaminothiocarbamido and X is an atom selected from the group consisting of oxygen and sulfur.

The xanthenyl amides of the present invention are depicted by Formula I when R is defined as:

4-(lower)alkylpiperazinylthio(lower)alkanoylamido,
di(lower)alkylaminothio(lower)alkanoylamido,
di(lower)alkylamino(lower)alkanoylamido,
pyrrolidinyl(lower)alkanoylamido,
4-(lower)alkylpiperazinyl(lower)alkanoylamido,
piperidino(lower)alkanoylamido,
morpholino(lower)alkanoylamido,
lower alkanoylamido, and
halo(lower)alkanoylamido.

Examples of these compounds are:

3-dimethylamino-N-(9-xanthenyl)thiopropionamide;
N-(9-xanthenyl)-3-dimethylaminopropionamide;
N-(9-xanthenyl)-1-pyrrolidinepropionamide;
N-(9-xanthenyl)-4-methyl-1-piperazinepropionamide bishydrochloride;
N-(9-xanthenyl)-3-piperidinopropionamide;
N-(9-xanthenyl)-4-morpholenepropionamide, and
N-(9-xanthenyl)-3-iodopropionamide.

The xanthenyl amides of this invention may be prepared by the interaction of xanthydrol with an appropriate acid amide, as illustrated by the following equation:

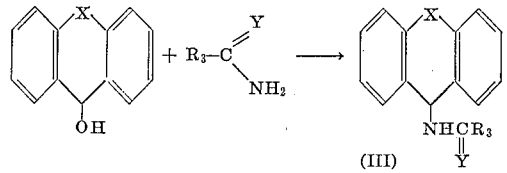
(III)

wherein X is defined as above, $R_3$ is selected from the group consisting of 4-(lower)alkylpiperazinylalkyl, di-(lower)alkylaminoalkyl, di(lower)alkylamino(lower)alkyl, pyrrolidinyl(lower)alkyl, 4-(lower)alkylpiperazinyl-(lower)alkyl, piperidino(lower)alkyl, morpholino(lower)-alkyl, lower alkyl and halo(lower)alkyl; and Y is an atom selected from the group consisting of oxygen and sulfur with the proviso that Y is sulfur when $R_3$ is 4-(lower)-alkylpiperazinylalkyl and di(lower)alkylaminoalkyl. This reaction is also conducted in the presence of an alkanoic acid, preferably acetic acid, at a temperature of about 100° C. for a period of about one hour to about twenty-four hours. When the reaction is complete, the precipitated product (III), a xanthenyl amide, is separated by routine procedures well known in the art, e.g. filtration and re-crystallization from a suitable solvent, such as an alkanol, alkanol-alkane mixtures and alkanol-ether mixtures.

Alternatively, the xanthenyl amides of this invention, with the exception of N-(9-xanthenyl)halo(lower)alkanoylamides, may be prepared by reacting a N-(9-xanthenyl)-halo(lower)alkanoylamide with an appropriate amine. This reaction may be conducted in a reaction-inert, water immiscible, organic solvent at about reflux temperatures for a period of about five minutes to about two hours. When the reaction is complete, the product is separated by standard recovery methods, for example, aqueous extraction and subsequent concentration of the organic layer.

The xanethenyl thiosemicarbazides of the present invention are represented by Formula I when R is thiosemicarbazido. These compounds are known as 1-N-(9-xanthenyl)thiosemicarbazide and 1-N-(9-thioxanthenyl) thiosemicarbazide, which may be prepared by the reaction of an appropriate xanthydrol with thiosemicarbazide, as illustrated in the following equation:

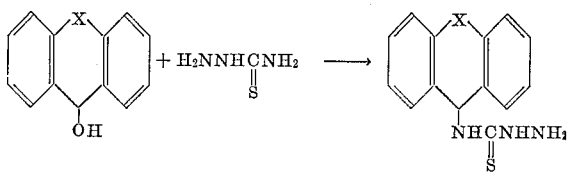
(V)

wherein X is defined as above. This reaction is conducted in the presence of an alkanoic acid, preferably acetic acid, at about steam bath temperature for a period of approximately fifteen hours. When the reaction is complete, the reaction mixture is cooled and the precipitated product (V), a xanethenylthiosemicarbazide is separated by filtration.

Many of the starting compounds utilized in the preparation of the xanthene derivatives of the present invention are known compounds which are readily available from commercial sources, while others can easily be prepared in accordance with standard organic procedures well known to those skilled in the art. The 1-carbamoyl-azepine-4-carboxylic acid ester reactants employed herein are prepared by the method described in copending application "Substituted Hexahydro - 4 - Phenylazepine-4-Carboxylic Acid Esters," Ser. No. 410,716, filed on Nov. 12, 1964, and now abandoned in favor of continuation-in-part application Ser. No. 707,898, filed Nov. 6, 1967, now abandoned. Further, the dialkylaminothioalkanoylamide starting materials are prepared and described in application Ser. No. 595,603, filed on Nov. 21, 1966, by Stephen I. Sallay and entitled "Aminothioamides," now abandoned.

Since many of the nitrogen containing compounds of the present invention are basic, advantage may be taken of the water solubility of salts of these compounds formed with acids in the isolation and/or purification of the above compounds for oral or parenteral administration. Of course, only salts formed with pharmaceutically-acceptable acids should be employed in therapeutic applications. Particularly effective salts are those formed with pharmaceutically acceptable acids having a pH value of 3 or lower. Such acids are well-known in the art, for example, hydrochloric, hydrobromic, hydroiodic, sulfuric, nitric, phosphoric, acetic, lactic, citric, tartaric, maleic, gluconic, fumaric, benzenesulfonic, toluenesulfonic, methylsulfonic, ethylsulfonic acids and the like. These salts may be prepared by procedures commonly employed in the art, for example, reacting the compound with an equivalent of the selected acid in aqueous solution and concentration of the solution. Other known procedures may also be employed.

In accord with the present invention, the xanthene derivatives of the present invention, with the exception of the N-(9-xanthenyl)-haloalkanoylamides, have been found to possess interesting pharmaceutical properties which render them useful as synthetic medicinals. More particularly, these compounds, in standard pharmacological tests, have exhibited anti-cholinergic properties and are particularly useful as anti-convulsants or mydriatic agents.

The N-(9-xanthenyl)haloalkanoylamides of this present invention are useful as intermediates in the preparation of xanethenyl amides.

In the pharmacological evaluation of the central nervous system activity of the compounds of this invention, the in vivo effects are tested as follows. The compound is administered intraperitoneally to three mice (14 to 24 grams) at each of the following doses: 400, 127, 40 and 12.7 mg./kg. The animals are watched for a minimum of two hours during which time signs of general stimulation (i.e., increased spontaneous motor activity, hyperactivity on tactile stimulation, twitching), general decreased spontaneous motor activity, decreased respiration and autonomic activity (i.e., miosis, mydriasis, diarrhea) are noted. The compounds of the present invention in the above test procedure induce mydriatic stimulation at 127 milligrams per kilogram of host body weight (mg./kg.).

The anti-convulsant activity of the compounds is determined by the following procedure. The compounds to be tested are administered at a number of dose levels orally (or intraperitoneally) to groups of six mice (3 males and 3 females) at each dose level. One hour later (or one-half hour later if the compound is administered intraperitoneally) the animals are challenged with oxytremorine 0.4 mg./kg. administered intraperitoneally. The animals are graded at ten and twenty minutes for degree of tremors, salivation, lacrimation, and diarrhea.

Protection against these symptoms is determined by a comparison with controls run simultaneously.

Percent antagonism at each time interval is calculated as follows:

percent antagonism=

$$\frac{\text{ave. score (control)} - \text{ave. score (test)}}{\text{ave. score (control)}} \times 100$$

The compounds of this invention in the above test procedure antagonized the convulsant effects of oxytremorine after 30 minutes to two hours and have a calculated $ED_{50}$ of 30 to 200 milligrams per kilogram of host weight. The effective dose for fifty percent of the hosts is termed $ED_{50}$.

When the xanthene derivatives of this invention, with the exception of the N-(9-xanthenyl)-haloalkanoylamides are employed as tranquilizers and anticonvulsants, they may be administered alone or in combination with pharmacologically acceptable carriers, the proportion of which is determined by the solubility and chemical nature of the compound, chosen route of administration and standard pharmacological practice. For example, they may be administered orally in the form of tablets or capsules containing such excipients as starch, milk, sugar, certain types of clay and so forth. They may be administered sublingually in the form of troches or lozenges in which the active ingredient is mixed with sugar and corn syrups, and then dehydrated sufficiently to make it suitable for pressing into a solid form. They may be administered orally in the form of solutions which may contain coloring and flavoring agents or they may be injected parenterally, that is intramuscularly, intravenously or subcutaneously. For parenteral administration they may be used in the form of a sterile solution containing other solutes, for example, enough saline or glucose to make the solution isotonic. The dosage of the present compounds will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. It will generally be found that when the composition is administered orally, larger quantities of the active agent will be required to produce the same effect as a smaller quantity given parenterally. In general, the compounds of this invention are most desirably administered at a concentration level that will generally afford effective results without causing any harmful or deleterious side effects.

The following examples are given by way of illustration.

EXAMPLE I

Xanthydrol (3 c. mole) and β-iodopropionamide (3 c. mole) are dissolved in 35 ml. of acetic acid and heated on a steam bath for five hours. The resulting precipitate is filtered and washed with petroleum ether and then recrystallized from ethanol to afford N-(9-xanthenyl)-3-iodopropionamide, M.P. 188.5–189.0° C.

Analysis.—Calc'd for $C_{16}H_{14}O_2NI$ (percent): C, 50.65; H, 3.72; N, 3.69. Found (percent): C, 50.60; H, 3.60; N, 3.83.

Similarly, the following compounds are obtained:

N-(9-thioxanthenyl)-2-chloroacetamide;
N-(9-xanthenyl)-4-bromobutyramide;
N-(9-thioxanthenyl)-5-iodovaleramide; and
N-(9-xanthenyl)-6-chlorocaproamide.

EXAMPLE II

N-(9-xanthenyl)-3-iodopropionamide (6 c. mole), as prepared in Example I, is dissolved in 150 ml. of chloroform and mixed with 12 ml. of N-methylpiperazine. The resulting mixture is heated to reflux for fifteen minutes, cooled and then extracted with water. The chloroform layer is separated, dried and evaporated under reduced pressure. The residue is reacted with 1 N hydrochloric acid to afford N-(9-xanthenyl)-4-methylpiperazine-propionamide bishydrochloride, M.P. 143.5–145° C. when recrystallized from ethanol.

Similarly, reacting N-(9-thioxanthenyl)-2-chloroacetamide with N-methylpiperazine affords N-(9-xanthenyl)-4-methyl-1-piperazineacetamide.

EXAMPLE III

N-(9-xanthenyl)-3-iodopropionamide (12 c. mole), as prepared in Example II, is dissolved in 300 ml. of dichloromethane and admixed with 25 ml. of dimethylamine. The reaction mixture is then refluxed for ten minutes, cooled and extracted with water. The dichloromethane layer is separated, dried and evaporated under vacuum. The residue is recrystallized from ethylacetate-hexane to yield N-(9-xanthenyl)-3-dimethylamino-propionamide, M.P. 151–152° C.

*Analysis.*—Calc'd for $C_{18}H_{20}O_2N_2$ (percent): C, 72.95; H, 6.80; N, 9.45. Found (percent): C, 73.20; H, 7.12; N, 9.56.

EXAMPLE IV 4-(9-xanthenyl)-3-thiosemicarbazide (1.0 g.), as prepared above, and 10 ml. of benzaldehyde are dissolved in 20 ml. of methanol and then heated on a steam bath for forty-five minutes. After the reaction is complete, the reaction mixture is cooled, the precipitated product is separated by filtration and recrystallized from ethanol to yield benzaldehyde, 4-(9-xanthenyl)-3-thiosemicarbazone, M.P. 220–221° C.

*Analysis.*—Calc'd for $C_{21}H_{17}N_3OS$ (percent): C, 70.18; H, 4.77; N, 11.69; S, 8.91. Found (percent): C, 69.95; H, 4.90; N, 11.31; S, 8.70.

In a similar manner, 4-(9-thioxanthenyl)-3-thiosemicarbazide is reacted with benzaldehyde to afford benzaldehyde, 4-(9-thioxanthenyl)-3-thiosemicarbazone.

EXAMPLE V

Methyl ethyl ketone (10 ml.) and 4-(9-xanthenyl)-3-thiosemicarbazide (1.0 g.) are refluxed for twelve hours. Thereafter, the reaction mixture is cooled and the precipitated solid separated by filtration. In this manner, is obtained pale yellow crystals of 2-butanone, 4-(9-xanthenyl)-3-thiosemicarbazone, M.P. 183–184° C.

*Analysis.*—Calc'd for $C_{18}H_{19}ON_3S$ (percent): C, 66.40; H, 5.88; N, 12.92; S, 9.83. Found (percent): C, 66.33; H, 6.15; N, 12.60; S, 9.80.

In a similar manner, by the interaction of 4-(9-thioxanthenyl)-3-thiosemicarbazide and methyl ethyl ketone there is obtained 2-butanone, 4-(9-thioxanthenyl)-3-thiosemicarbazone.

What is claimed is:

1. A compound as described in claim 5 which is: N-(9-xanthenyl)-3-dimethylaminopropionamide.
2. A compound as described in claim 5 which is benzaldehyde, 4-(9-xanthenyl)-3-thiosemicarbazone.
3. A compound as described in claim 5 which is: 2-butanone, 4-(9-xanthenyl)-3-thiosemicarbazone.
4. A compound as described in claim 5 which is: N-(9-xanthenyl)-3-iodopropionamide.
5. A compound selected from the group consisting of those having the formula:

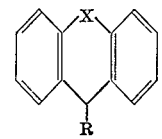

wherein X is selected from the group consisting of sulfur and oxygen and R is selected from the group consisting of:
  (A) N-methylpiperazinepropionylamino
  (B) Dimethylaminopropionylamino;
  (C) Benzylidene, thiosemicarbazido;
  (D) 2-butylidene, thiosemicarbazido;
  (E) Iodopropionylamino.
6. A compound as defined in claim 5 as follows: N-(9-xanthenyl)-4-methyl-1-piperazinepropionamide.

No references cited.

ALEX MAZEL, Primary Examiner

JOSE TOVAR, Assistant Examiner

U.S. Cl. X.R.

260—268, 328, 335; 424—250, 275, 278